United States Patent

Dewart et al.

[11] Patent Number: 6,114,456
[45] Date of Patent: Sep. 5, 2000

[54] MEDIUM DENSITY POLYETHYLENE COMPOSITIONS FOR FILM APPLICATIONS

[75] Inventors: Jean-Christophe Dewart, Berchem-Ste-Agathe; Jacques Everaert, Heverlee, both of Belgium

[73] Assignee: Fina Research, S.A., Feluy, Belgium

[21] Appl. No.: 08/977,723

[22] Filed: Nov. 25, 1997

Related U.S. Application Data

[60] Provisional application No. 60/034,900, Feb. 7, 1997.

[30] Foreign Application Priority Data

Nov. 25, 1996 [EP] European Pat. Off. ............. 96113843
Apr. 9, 1997 [EP] European Pat. Off. ............. 97105841

[51] Int. Cl.$^7$ .................................................. C08L 23/04
[52] U.S. Cl. ............................................. 525/240
[58] Field of Search .............................................. 525/240

[56] References Cited

U.S. PATENT DOCUMENTS

| | | | |
|---|---|---|---|
| 4,230,831 | 10/1980 | Sakurai | 525/240 |
| 5,420,220 | 5/1995 | Cheruvu | 526/348.1 |
| 5,539,076 | 7/1996 | Nowlin | 526/348.1 |
| 5,585,184 | 12/1996 | Baker | 428/407 |
| 5,614,456 | 3/1997 | Mink | 502/115 |
| 5,616,661 | 4/1997 | Eisinger | 526/88 |
| 5,714,425 | 2/1998 | Chabrand | 502/117 |
| 5,756,193 | 5/1998 | Yamamoto | 428/220 |
| 5,843,540 | 12/1998 | Heydarpour | 428/35.2 |
| 5,882,750 | 3/1999 | Mink | 428/35.7 |

*Primary Examiner*—Paul R. Michl
*Attorney, Agent, or Firm*—Jim D. Wheelington; M. Norwood Cheairs

[57] ABSTRACT

Use of a homogeneous blend of a metallocene-catalyzed medium density polyethylene (mMDPE) with low density polyethylene (LDPE) and/or a linear low density polyethylene (LLDPE), to produce blown films, this composition essentially consisting of from 0.5 to 100% by weight of MMDPE and from 0 to 99.5% by weight of LDPE and/or LLDPE.

The compositions of this invention have good processability and are used to make blown films which have the good optical properties of LDPE and the good mechanical and processing properties of MDPE.

8 Claims, 1 Drawing Sheet

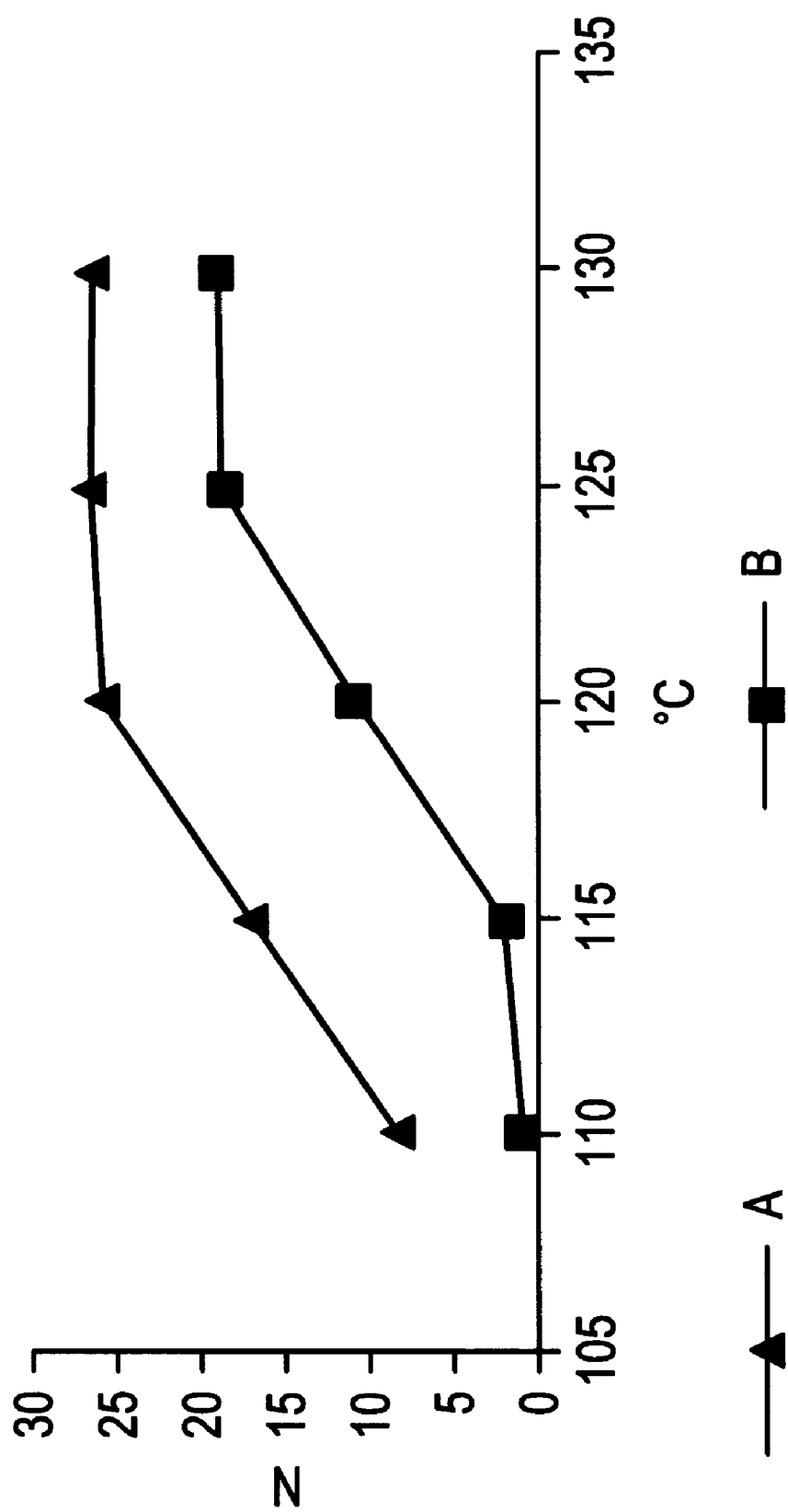

MEDIUM DENSITY POLYETHYLENE COMPOSITIONS FOR FILM APPLICATIONS

This application claims benefit of Provisional Application 60/034,900 filed Feb. 7, 1997.

BACKGROUND OF THE INVENTION

1. Field of the Invention

The present invention relates to polyethylene compositions and films thereof combining excellent optical and mechanical properties with good processability and downgauging possibilities while assuring an excellent stiffness. This polyethylene composition can therefore be used for film applications, requiring this unique combination of properties, such as but not exclusively, food or non-food packaging, personal care products, agricultural or industrial products.

2. Description of the Prior Art

Low density polyethylene (LDPE) offers excellent optical properties and can be processed at low temperatures and pressures while maintaining a good melt strength. LDPE has however limited possibilities for downgauging, due to a low draw ratio, and a low stiffness.

Linear-low-density polyethylene (LLDPE) has greatly improved downgauging possibilities and excellent tear and impact properties; its stiffness however remains low and its processability is well below that of LDPE. Also, conventional LLDPE's optical properties do not match those of LDPE. Optical properties of LLDPE have been improved by using metallocene-catalyzed LLDPE (mLLDPE) resins; stiffness is however not improved in these products and the processability of these grades is generally worse than that of conventional LLDPE.

Wherever high rigidity is needed, LDPE and LLDPE compositions will require overly thick structures. Especially for LLDPE, where excellent impact and tear properties render its downgauging capability useful, the lack of rigidity may be a main drawback. High rigidity may be a requirement for the end product, it is very often a necessity for product handling.

Conventional medium density polyethylene (MDPE) offers a much improved rigidity, excellent processability and downgauging possibilities. MDPE however lacks the good optical properties of LDPE or LLDPE.

Blends of conventional MDPE with LDPE and/or LLDPE can be used for improving rigidity and/or downgauging and/or processability of LDPE and/or LLDPE but do not provide their good optical properties. WO 95/27005 discloses mixtures of LDPE with LLDPE or mLLDPE. The stiffness of their resins is insufficient.

SUMMARY OF THE INVENTION

Therefore, there exists a need for a polyethylene composition that will match the transparency and gloss offered by LDPE and the stiffness of MDPE while maintaining the same impact, tear, downgauging and processing properties as MDPE.

It is therefore an object of the present invention to provide polyethylene compositions that will achieve a better balance between the good optical qualities of LDPE and the rigidity, downgauging, processability, impact and tear properties of MDPE

BRIEF DESCRIPTION OF THE DRAWING

A more complete appreciation of the invention and many of the attendant advantages thereof will be readily understood by reference to the following detailed description when considered in connection with the accompanying drawing wherein:

FIG. 1 represents the Hot Tack in g/15 mm as a function of temperature for a pure MMDPE (density=0.932 g/cm$^3$ and MI2=0.5 g/10') composition of the present invention and for a conventional MDPE (density=0.938 g/cm$^3$ and MI2=0.15 g/10').

DESCRIPTION OF THE INVENTION

This invention is the use, to produce films, of a homogeneous blend of a low density polyethylene (LDPE) and/or a linear low density polyethylene (LLDPE) with a metallocene-catalyzed medium density polyethylene (mMDPE), said blend essentially consisting of from 0.5 to 100% by weight of MMDPE and from 0 to 99.5% by weight of LDPE and/or LLDPE, and the metallocene catalyst system comprising a bis tetrahydro-indenyl compound, alone or in combination with another metallocene catalyst which contributes less than 80% by weight of said catalyst combination. They have good processability and downgauging capabilities and are used to make films, particularly blown films, which have good optical and mechanical properties.

When metallocene-catalyzed medium density polyethylene (mMDPE) are used in compositions using pure mMDPE or blends with low density and/or linear low density polyethylenes (LDPE and/or LLDPE), we have now surprisingly found that films can be obtained under extrusion conditions of LDPE, with optical performances comparable to LDPE and elongational deformation capabilities of chromium-catalyzed MDPE.

This result was unexpected as it is commonly accepted that the use of metallocene catalysts becomes less advantageous over the use of conventional catalysts as the density increases; the improvements observed in low and very low density resins, such as improved impact and optical properties, are thus not expected in higher density resins.

The manufacture of the low density and linear low density polyethylenes used in the present invention is known in the art and is described for example in "Encyclopedia of Polymer Science and Engineering", second edition, Volume 6, on pages 404 to 410 (LDPE) and pages 436 to 444 (LLDPE). Metallocene catalysts have not been employed to prepare the LDPE and/or LLDPE used in the blends of the present invention.

The catalyst system used in the present invention to manufacture medium density polyethylene comprises necessarily a bis tetrahydro-indenyl compound of the general formula (IndH$_4$)$_2$R"MQ$_2$ in which each Ind is the same or different and is indenyl or substituted indenyl, R" is a bridge which comprises a C$_1$–C$_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen.

Each bis tetrahydro-indenyl compound may be substituted in the same way or differently from one another at one or more positions in the cyclopentadienyl ring, the cyclohexenyl ring and the ethylene bridge.

Each substituent group may be independently chosen from those of formula XR$_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted. In a particularly preferred embodiment, both indenyls are unsubstituted.

R" is preferably a $C_1$–$C_4$ alkylene radical (as used herein to describe a difunctional radical, also called alkylidene), most preferably an ethylene bridge (as used herein to describe a difunctional radical, also called ethylidene), which is substituted or unsubstituted.

The metal M is preferably zirconium, hafnium or titanium, most preferably zirconium. Each Q is the same or different and may be a hydrocarbyl or hydrocarboxy radical having 1–20 carbon atoms or a halogen. Suitable hydrocarbyls include aryl, alkyl, alkenyl, alkylaryl or aryl alkyl. Each Q is preferably halogen.

Ethylene bis(4, 5, 6, 7-tetrahydro-1-indenyl) zirconium dichloride is a particularly preferred bis tetrahydro-indenyl compound of the present invention.

The metallocene catalyst component used in the present invention can be prepared by any known method. A preferred preparation method is described in J. Org. Chem. 288, 63–67 (1985).

Any metallocene catalyst known in the art as suitable for the polymerization of olefins can be used in combination with the bis tetrahydro-indenyl compound, in an amount not to exceed 80% by weight of said combination.

These are described for example in EP Application n° 96200422.9.

They can be represented by the general formulae:

$(Cp)_m MR_n X_q$  I.

wherein Cp is a cyclopentadienyl ring, M is a Group 4b, 5b or 6b transition metal, R is a hydrocarbyl group or hydrocarboxy having from 1 to 20 carbon atoms, X is a halogen, and m=1–3, n=0–3, q=0–3 and the sum of m+n+q will be equal to the oxidation state of the metal.

$(C_5R'_k)_g R"_s (C_5R'_k) MQ_{3-g}$  II.

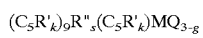

and $R"_s (C_5R'_k)_2 MQ'$  III.

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$–$C_6$ ring, R" is a $C_1$–$C_4$ alkylene radical, a dialkyl germanium or silicon or siloxane, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, Q' is an alkylidene radical having from 1 to about 20 carbon atoms, s is 0 or 1, g is 0,1 or 2, s is 0 when g is 0, k is 4 when s is 1 and k is 5 when s is 0, and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary halogen atoms include chlorine, bromine, fluorine and iodine and of these halogen atoms, chlorine is preferred.

Exemplary hydrocarboxy radicals are methoxy, ethoxy, propoxy, butoxy, amyloxy and the like.

Exemplary of the alkylidene radicals are methylidene, ethylidene and propylidene, and i-butylidene.

The metallocenes may be supported. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene.

Preferably, the support is a silica having a surface area comprised between 200 and 600 $m^2/g$ and a pore volume comprised between 0.5 and 3 ml/g.

An active site must be created by adding a cocatalyst having an ionizing action. While alumoxane can be used as cocatalyst, it is not necessary to use alumoxane as cocatalyst during the polymerization procedure for preparing medium density polyethylene according to the process of the present invention.

When alumoxane is used as a cocatalyst, any alumoxane known in the art can be used in the present invention.

The preferred alumoxanes comprise oligomeric linear and/or cyclic alkyl alumoxanes represented by the formulae:

R—(Al—O)$_n$—AIR$_2$ for oligomeric, linear alumoxanes and R  (IV)

(—Al—O)$_m$ for oligomeric, cyclic alumoxanes, R  (V)

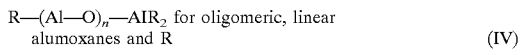
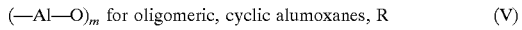

wherein n is 1–40, preferably 10–20, m is 3–40, preferably 3–20 and R is a $C_1$–$C_8$ alkyl group and preferably methyl.

Generally, in the preparation of alumoxanes from, for example, trimethyl aluminum and water, a mixture of linear and cyclic compounds is obtained.

Methylalumoxane is preferably used.

The alumoxane is usually delivered as a concentrated solution of alumoxane in toluene.

When alumoxane is not used as a cocatalyst, according to a preferred embodiment of the present invention, one or more aluminiumalkyl represented by the formula $AIR_x$ are used wherein each R is the same or different and is selected from halides or from alkoxy or alkyl groups having from 1 to 12 carbon atoms and x is from 1 to 3. Especially suitable aluminumalkyl are trialkylaluminum selected from trimethylaluminum, triethylaluminum, triisobutylaluminum, tri-n-octylaluminum or tri-n-hexylaluminum, the most preferred being triisobutylaluminum (TIBAL).

The amount of alumoxane or aluminiumalkyl and metallocene usefully employed in the preparation of the solid support catalyst can vary over a wide range. Preferably, the aluminum to transition metal mole ratio is comprised between 1:1 and 100:1, preferably between 5:1 and 50:1.

The metallocene catalyst utilized to produce the medium density polyethylene required by the present invention can be used in gas, solution or slurry polymerizations. Preferably, in the present invention, the polymerization process is conducted under slurry phase polymerization conditions. It is preferred that the slurry phase polymerization conditions comprise a temperature of from 20 to 125° C., preferably from 60 to 95° C. and a pressure of from 0.1 to 5.6 MPa, preferably from 2 to 4 MPa for a time between 10 minutes and 4 hours, preferably between 1 and 2.5 hours.

It is preferred that the polymerization reaction be run in a diluent at a temperature at which the polymer remains as a suspended solid in the diluent. Diluents include, for examples, isobutane, n-hexane, n-heptane, methylcyclohexane, n-pentane, n-butane, n-decane, cyclohexane and the like. The preferred diluent is isobutane.

According to a preferred embodiment of the present invention, a continuous reactor is used for conducting the polymerization. This continuous reactor is preferably a loop reactor. During the polymerization process, at least one monomer, the catalytic system and a diluent are flowed in admixture through the reactor.

In the present invention average molecular weights can be further controlled by the introduction of some amount of hydrogen or by changing the temperature during polymerization. When hydrogen is used it is preferred that the relative amounts of hydrogen and olefin introduced into the polymerization reactor be within the range of about 0.001 to 15 mole percent hydrogen and 99.999 to 85 mole percent olefin based on total hydrogen and olefin present, preferably about 0.2 to 3 mole percent hydrogen and 99.8 to 97 mole percent olefin The densities of the metallocene catalyzed polyethylenes (mMDPE) used in the present invention are regulated by the amount of comonomer injected in the reactor; they will range from 0.925 g/cm$^3$ to 0.955 g/cm$^3$ and preferably from 0.930 g/cm$^3$ to 0.945 g/cm$^3$. Examples of comonomer which can be used include 1-olefins butene, hexene, octene, 4-methyl-pentene, and the like, the most preferred being hexene.

The melt indices of the metallocene catalyzed polyethylene (mMDPE) used in the present invention can be regulated by the amount of hydrogen injected in the reactor; they will range from 0.05 g/10' to 5 g/10', preferably from 0.1 g/10' to 4 g/10'.

Research has been conducted on metallocene catalysts leading to a very wide range of polyethylene products with both narrow and broad molecular weight distribution (MWD).

In changing the MWD, resins are obtained with largely different viscous behavior. The shear response sensitivity is commonly expressed by the ratio (SR2) of melt flows (ASTM D-1238-89A at 190° C.) with loads of 21.6 kg (HLMI) and 2.16 kg (MI2). Resins with a narrow MWD have typical SR2 values of about 15. The resins of the present invention have values going from the typical low values of about 15 for narrow MWD resins to values ranging from 15 to 70 depending on the catalyst used for polymerization, the production conditions and the M12-value of the resulting resin.

Standard additives may be used for both long term and processing stabilization and if desired, one or more pigments and/or dyes can also be added.

The applicants have found that the selection of catalyst composition and production conditions allows independent determination of M12, density and SR2 values. For conventional catalytic systems, the values of SR2 are, within rather narrow limits, defined by the choice of M12.

The mMDPE catalyzed by the procedure described hereabove are used in pure form or in blends with LDPE and/or LLDPE in various ratios.

According to embodiments of the present invention, compositions of LDPE and/or LLDPE with MMDPE are obtained either by preliminary dry blend or extrusion or by direct blend in the hopper or via the extruder.

Materials are run under production conditions for existing commercial applications where processability, downgauging and good optics are key issues. Excellent outputs are achieved.

Generally, the blends of the present invention comprise from about 0.5 to 100% by weight of MMDPE and from 0 to 99.5% by weight of LDPE and/or LLDPE. Preferably the composition of the present invention comprises from 2.5 to 70% by weight of MMDPE and from 30 to 97.5% by weight of LDPE and/or LLDPE.

It is surprisingly observed that excellent transparency and gloss are obtained for all the compositions tested in the above mentioned ranges.

It is also observed that the mechanical properties of the compositions are comparable to those of the mixtures using conventional MDPE and do not present any of the drawbacks observed in mixtures with low density polyethylenes (LDPE or LLDPE).

Particularly, the rigidity of the mixture is improved with respect to that of the LDPE; this will allow a reduction in film thickness. For a classic LDPE with a M12 of 0.3 g/10' it is impossible, under conventional high output conditions, to obtain a film thickness smaller than 40 $\mu$m. The thickness can be drastically reduced when the LDPE is blended with a metallocene catalyzed medium density polyethylene.

From the multiple trials we have run, one can describe the global "processability" picture of mMDPE as follows:

drawability down to 7 $\mu$m even on conventional LDPE equipment excellent bubble stability no loss of output in comparison with the best LLDPE's, at facilities used to run
  LLDPE; in the worst cases (LDPE screws), a loss of maximum 10% output is
    largely compensated by downgauging parameters (pressure, torque, temperatures) in line with conventional resins.
    no processing additive required.

In the compositions of this invention, it is thus observed that MMDPE gives clarity, excellent and balanced tear properties, high impact resistance while maintaining the standard downgauging possibilities, stiffness and good processability of conventional MDPE.

EXAMPLES

1. Polymerization procedure and product composition. The polymerization of metallocene-catalyzed medium density polyethylene of the present invention was carried out in a liquid-full slurry loop reactor. Ethylene was injected with 1-hexene together with the catalyst. Isobutane was used as diluent. The polymerization conditions are indicated in Table I, and the polyethylene properties are indicated in Table II.

TABLE I

|  | Resin R1 |
|---|---|
| C2 feed (kg/h) | 1600 |
| C6 feed (g/kg C2) | 43 |
| H2 feed (mg/h) | 10000 |
| Iso C4 feed (kg/h) | 1950 |
| Tibal conc (ppm) | 500 |
| Tpol (° C.) | 86 |

C2 = ethylene
C6 = 1-hexene
Iso C4 = isobutane
TIBAL = triisobutylaluminum

TABLE II

| Resin | Resin R1 | Resin R2 | Resin R3 | Resin R4 | Resin R5 |
|---|---|---|---|---|---|
| Catalyst | Cat 1 | Cat 1 | Cat 1 | Cat 3 | Cat 3 |
| Density (g/cc) | 0.932 | 0.934 | 0.944 | 0.928 | 0.930 |
| Ml2 pellets (g/10') | 0.5 | 0.8 | 2.2 | 0.10 | 0.18 |
| HLMI pellets (g/10') | 19 | 21 | 43 | 6.4 | 9.2 |
| SR2 pellets | 38 | 26 | 20 | 64 | 5 |

Bulk density (ASTM-D-1895)
Ml2 = Melt Index (ASTM-D-1238-89A) measured at a temperature of 190° C. and under a load of 2.16 kg.
HLMI = High Load Melt Index (ASTM-D-1238-89A) measured at a temperature of 190° C. and under a load of 21.6 kg.
SR2 = HLMI/Ml2
Cat 1: 50% of Cat 2 + 50% of Cat 3
Cat 2: bis(isobutyl-cyclopentadienyl) zirconium dichloride
Cat 3: bis(tetrahydro-indenyl) ethylene zirconium dichloride 2. Processing properties.

The drawability of Resin R1, whether pure or in blend with a LDPE characterized by a density of 0.922 g/cm$^3$ and a melt index M12 of 0.3 g/10' is given in Table III

TABLE III

| Weight % Resin R1 | Drawability (µm) |
|---|---|
| 0 | 40 |
| 25 | 20 |
| 100 | 7 |

The drawability (draw down) is the minimum film thickness that can be obtained before rupture of the film under a set of processing conditions. The data of Table III were obtained using a blown film equipment with a die of 150 mm, a die gap of 0.75 mm (typical for LDPE), a Blow Up Ratio (BUR) of 2 and an output of 40 kg/h.

It must be noted that in the case of a LDPE of melt index M12=2 g/10' it is technically possible to decrease the film thickness below 40 µm but the mechanical properties will be totally inadequate. According to the present invention, the film thickness can be decreased while keeping excellent mechanical properties.

The ease of processing for the products of the present invention is illustrated in Table IV. The extrusion was performed on a blown film line equipment with a die of 150 mm and a die gap of 0.75 mm; it allows the use of temperatures and pressures similar to those used for conventional MDPE.

TABLE IV

|  | MDPE reference | mMDPE |
|---|---|---|
| Ml2 dg/min | 0.15 | 0.5 |
| Density g/ml | 0.934 | 0.932 |
| SR2- | 100 | 38 |
| Melt temperature ° C. | 223 | 236 |
| Melt pressure bar | 290 | 220 |
| Output kg/h | 52 | 42.6 |
| Drawdown µm | 9 | 7 |

Another example is illustrated in Table V, using a blown film line equipment with a die diameter of 200 mm, and a die gap of 2.5 mm. Under these conditions the mMDPE grade could be extruded to a thinner film and at a lower temperature than the reference MDPE grade, while maintaining a comparable extrusion pressure.

TABLE V

|  | MDPE reference | mMDPE |
|---|---|---|
| Ml2 dg/min | 0.15 | 0.5 |
| Density g/ml | 0.934 | 0.932 |
| SR2- | 100 | 38 |
| Melt temperature ° C. | 236 | 192 |
| Melt pressure bar | 180 | 175 |
| Output kg/h | 100 | 100 |
| Drawdown µm | 20 | 8 |

The mMDPE grades and the reference MDPE grades did not contain processing additives.

3. Film properties.

Optical properties (haze and gloss), tear properties (Elmendorf) in machine direction (MD) and transverse direction (TD) and impact properties (Dart) of a 40 µm film are given in Table VI. It is seen that impact and tear properties of a mMDPE grade match those of the reference MDPE grade, whereas gloss and haze are markedly improved. This results in a film with comparable rigidity, tear and impact resistance exhibiting at the same time better clarity and surface aspect.

TABLE VI

|  | MDPE reference | mMDPE |
|---|---|---|
| Ml2 dg/min | 0.15 | 0.5 |
| Density g/ml | 0.934 | 0.932 |
| SR2 | 100 | 38 |
| Dart impact g | 88 | 91 |
| Elmendorf Tear MD N/mm | 17 | 22 |
| Elmendorf Tear TD N/mm | 400 | 92 |
| Orientation TD/MD - | 23 | 4.2 |
| Haze % | 73 | 13 |
| Gloss at an angle of 45° % | 6 | 43 |

The gloss was measured at an angle of 45° with the Byk-Gardner micro-gloss reflectometer; the haze was measured with the Byk-Gardner Hazegard® system; the tear resistance was measured with the Elmendorf Test, in the machine direction (MD) and in the transverse direction (TD); the impact was measured as Dart impact dropped from a height of 66 cm.

The conventional medium density polyethylene used in the comparative examples has been obtained using a liquid-full slurry loop reactor with a chromium catalyst and hexene as comonomer.

Properties of blends using 75% LDPE (density=0.922 g/cm$^3$ and M12=0.3 g/10') and 25% of either a conventional MDPE (blend 1) used here as comparative Example or a mMDPE (blend 2) of the present invention, are illustrated in Table VII. The blends were prepared by dry preblending of the components.

TABLE VII

|  | Blend 1 | Blend 2 |
|---|---|---|
| Drawdown µm | 17 | 20 |
| Melt temperature ° C. | 203 | 187 |
| Melt pressure bar | 210 | 234 |
| Dart impact g | 45 | 88 |
| Elmendorf MD N/mm | 27 | 45 |
| Elmendorf TD N/mm | 80 | 50 |
| Haze % | 30 | 19 |
| Gloss at an angle of 45° % | 20 | 34 |

Again it is observed that downgauging/draw down as well as processing (melt temperature and pressure) are fully comparable for both blends.

Dart impact, Elmendorf Tear in Machine Direction, Haze and Gloss are however markedly improved with blend 2, containing the mMDPE of the present invention.

A higher hot tack strength is observed at lower temperatures as illustrated in FIG. 1 which represents the Hot Tack in g/15 mm as a function of temperature for a pure mMDPE (density=0.932 g/cm$^3$ and M12=0.5 g/10') composition of the present invention and for a conventional MDPE (density=0.938 g/cm$^3$ and M12=0.15 g/10'). Hot tack properties were measured on a HSG-C Brugger equipment after a welding time of 0.2 sec; no delay time was allowed before applying the weight for separating the sealed film.

What is claimed is:

1. A process for producing a homogeneous blend of a first component comprising a low density polyethylene (LDPE) and a linear low density polyethylene (LLDPE) having a density of lower than 0.925 g/cm$^3$ and a second component comprising a medium density polyethylene (MDPE) having a density of from 0.925 to 0.955 g/cm$^3$, the process comprising the steps of:
   a) producing the first component comprising a low density polyethylene and a linear low density polyethylene having a density of lower than 0.925 g/cm$^3$ using a first catalyst system which is other than a metallocene catalyst system;
   b) producing the second component comprising a metallocene catalyzed medium density polyethylene (mMDPE) having a density of from 0.925 to 0.955 g/cm$^3$ using a second, metallocene catalyst system essentially consisting of a bis tetrahydro-indenyl compound, alone or in combination with another metallocene catalyst which contributes less than 80% by weight of said metallocene; and
   c) blending together the first and second components to form a homogeneous blend by physical means, the blend essentially consisting of from 2.5 to 70% by weight of mMDPE and from 30 to 97.5% by weight of LDPE and LLDPE.

2. A process according to claim 1 wherein the tetrahydro-indenyl compound is bis(tetrahydro-indenyl)ethylene zirconium dichloride.

3. A process for producing a homogeneous blend of a first component comprising a low density polyethylene (LDPE) or a linear low density polyethylene (LLDPE) having a density of lower than 0.925 g/cm$^3$ and a second component comprising a medium density polyethylene (MDPE) having a density of from 0.925 to 0.955 g/cm$^3$, the process comprising the steps of:
   a) producing the first component comprising a low density polyethylene and a linear low density polyethylene having a density of lower than 0.925 g/cm$^3$ using a first catalyst system which is other than a metallocene catalyst system;
   b) producing the second component comprising a metallocene catalyzed medium density polyethylene (mMDPE) having a density of from 0.925 to 0.955 g/cm$^3$ using a second, metallocene catalyst system essentially consisting of a bis tetrahydro-indenyl compound, alone or in combination with another metallocene catalyst which contributes less than 80% by weight of said metallocene; and
   c) blending together the first and second components to form a homogeneous blend by physical means, the blend essentially consisting of from 2.5 to 70% by weight of mMDPE and from 30 to 97.5% by weight of LDPE or LLDPE.

4. A process according to claim 3 wherein the tetrahydro-indenyl compound is bis(tetrahydro-indenyl)ethylene zirconium dichloride.

5. A process for producing a blown film, the process comprising producing a homogeneous blend of a first component comprising a low density polyethylene (LDPE) and a linear low density polyethylene (LLDPE) having a density of lower than 0.925 g/cm$^3$ and a second component comprising a medium density polyethylene (MDPE) having a density of from 0.925 to 0.955 g/cm$^3$, the process comprising the steps of:
   a) producing the first component comprising a low density polyethylene and a linear low density polyethylene having a density of lower than 0.925 g/cm$^3$ using a first catalyst system which is other than a metallocene catalyst system;
   b) producing the second component comprising a metallocene catalyzed medium density polyethylene (mMDPE) having a density of from 0.925 to 0.955 g/cm$^3$ using a second, metallocene catalyst system essentially consisting of a bis tetrahydro-indenyl compound, alone or in combination with another metallocene catalyst which contributes less than 80% by weight of said metallocene;
   c) blending together the first and second components to form a homogeneous blend by physical means, the blend essentially consisting of from 2.5 to 70% by weight of mMDPE and from 30 to 97.5% by weight of LDPE and LLDPE; and
   d) blowing the homogeneous blend to from a blown film.

6. A process according to claim 5, wherein the tetrahydro-indenyl compound is bis(tetrahydro-indenyl)ethylene zirconium dichloride.

7. A process for producing a blown film, the process comprising producing a homogeneous blend of a first component comprising a low density polyethylene (LDPE) or a linear low density polyethylene (LLDPE) having a density of lower than 0.925 g/cm$^3$ and a second component comprising a medium density polyethylene (MDPE) having a density of from 0.925 to 0.955 g/cm$^3$, the process comprising the steps of:
   a) producing the first component comprising a low density polyethylene and a linear low density polyethylene having a density of lower than 0.925 g/cm$^3$ using a first catalyst system which is other than a metallocene catalyst system;
   b) producing the second component comprising a metallocene catalyzed medium density polyethylene (mMDPE) having a density of from 0.925 to 0.955 g/cm$^3$ using a second, metallocene catalyst system essentially consisting of a bis tetrahydro-indenyl compound, alone or in combination with another metallocene catalyst which contributes less than 80% by weight of said metallocene;
   c) blending together the first and second components to form a homogeneous blend by physical means, the blend essentially consisting of from 2.5 to 70% by weight of mMDPE and from 30 to 97.5% by weight of LDPE or LLDPE; and
   d) blowing the homogeneous blend to from a blown film.

8. A process according to claim 7 wherein the tetrahydro-indenyl compound is bis(tetrahydro-indenyl)ethylene zirconium dichloride.

* * * * *

UNITED STATES PATENT AND TRADEMARK OFFICE
CERTIFICATE OF CORRECTION

PATENT NO. : 6,114,456
DATED : September 5, 2000
INVENTOR(S) : Jean-Christophe Dewart, Jacques Everaert It is certified that error appears in the above-identified patent and that said Letters Patent is hereby corrected as shown below:

Foreign Application Priority Data

Nov. 25, 1996 [EP] European Patent Office.....96118843.0
Apr. 9, 1997  [EP] European Patent Office.....97105841.7

Signed and Sealed this

Eighteenth Day of September, 2001

Attest:

NICHOLAS P. GODICI
*Attesting Officer*  *Acting Director of the United States Patent and Trademark Office*